(12) United States Patent
Ozawa et al.

(10) Patent No.: US 8,836,619 B2
(45) Date of Patent: Sep. 16, 2014

(54) DISPLAY APPARATUS, DISPLAY DATA PROCESSING DEVICE, AND DISPLAY DATA PROCESSING METHOD

(71) Applicant: Sony Corporation, Tokyo (JP)

(72) Inventors: Atsushi Ozawa, Kanagawa (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 13/891,408

(22) Filed: May 10, 2013

(65) Prior Publication Data

US 2013/0249962 A1    Sep. 26, 2013

Related U.S. Application Data

(63) Continuation of application No. 12/585,178, filed on Sep. 8, 2009, now Pat. No. 8,441,419.

(30) Foreign Application Priority Data

Oct. 7, 2008    (JP) .................................. 2008-260607

(51) Int. Cl.
```
G09G 3/30      (2006.01)
G09G 3/32      (2006.01)
H04N 5/14      (2006.01)
G09G 5/10      (2006.01)
H04N 5/208     (2006.01)
G06F 3/14      (2006.01)
```
(52) U.S. Cl.
CPC ............. *G09G 3/3208* (2013.01); *H04N 5/142* (2013.01); *G09G 2360/16* (2013.01); *G09G 2330/021* (2013.01); *G09G 5/10* (2013.01); *G09G 3/3233* (2013.01); *G06F 3/14* (2013.01); *H04N 5/208* (2013.01); *G09G 2300/0842* (2013.01)
USPC ................................................ 345/77; 345/76

(58) Field of Classification Search
USPC ....................................................... 345/76, 77
See application file for complete search history.

(56) References Cited

U.S. PATENT DOCUMENTS

| | | | | |
|---|---|---|---|---|
| 6,097,847 A | * | 8/2000 | Inoue | 382/266 |
| 2002/0196211 A1 | * | 12/2002 | Yumoto | 345/76 |
| 2005/0169557 A1 | | 8/2005 | Xavier | |
| 2006/0206733 A1 | | 9/2006 | Ono | |
| 2006/0250385 A1 | * | 11/2006 | Plut | 345/211 |

FOREIGN PATENT DOCUMENTS

| | | |
|---|---|---|
| CA | 2665420 A1 | 4/2008 |
| JP | 2006-236159 | 9/2006 |
| JP | 2007-221821 | 8/2007 |
| JP | 2007-249436 | 9/2007 |

* cited by examiner

*Primary Examiner* — Latanya Bibbins
(74) *Attorney, Agent, or Firm* — Rader, Fishman & Grauer PLLC

(57) ABSTRACT

A display apparatus includes: an edge processing section extracting an edge component of a display data signal; a display data signal processing section changing the display data signal according to a level conversion signal and adding the edge component thereto; a level conversion signal generating section changing the level conversion signal according to the display data signal and a signal output from the display data signal processing section; and a display section performing a display operation according to the signal output from the display data processing section.

18 Claims, 10 Drawing Sheets

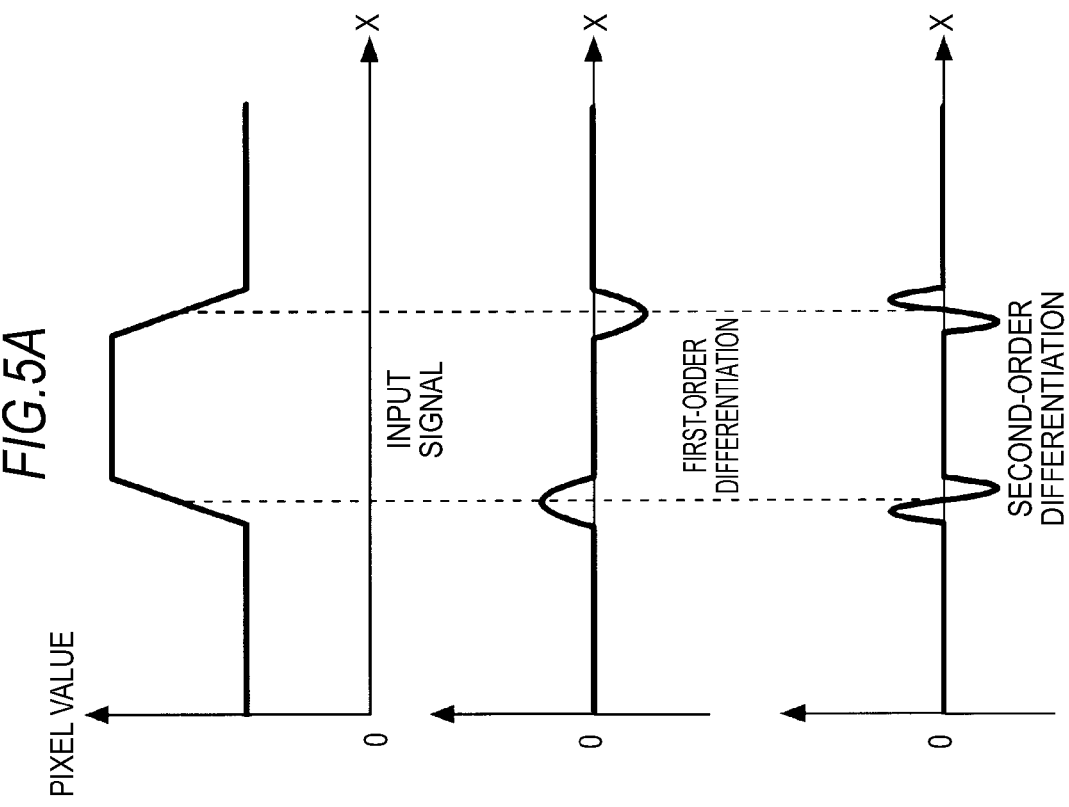

DISPLAY APPARATUS, DISPLAY DATA PROCESSING DEVICE, AND DISPLAY DATA PROCESSING METHOD

CROSS REFERENCES TO RELATED APPLICATIONS

This is a Continuation application of U.S. patent application Ser. No. 12/585,178 filed Sep. 8, 2009, with an issue date of May 14, 2013 as U.S. Pat. No. 8,441,419, which in turn claims priority from Japanese Application No. 2008-260607, filed on Oct. 7, 2008, the entire contents of which are incorporated herein by reference.

BACKGROUND OF THE INVENTION

1. Field of the Invention

The present invention relates to a display apparatus utilizing, for example, an organic EL (electroluminescence) panel a display data processing device incorporated in the display apparatus, and a display data processing method.

2. Description of the Related Art

Flat panel displays are widely used in the form of products such as computer displays, portable terminals, and television sets. Although liquid crystal display panels are most widely used at present, they still have the problems of narrow viewing angles and low response speeds which have always been pointed out.

On the contrary, organic EL displays formed using self-emitting elements are regarded as promising display apparatus of next generation to replace liquid crystal displays not only because the problems of viewing angles and response can be solved but also because they can be provided with a small thickness achieved by elimination of a backlight, high brightness, and high contrast.

However, the high power consumption of organic EL displays is still regarded as problematic, although such displays have already been put in practical use.

The suppression of power consumption is regarded as a significant challenge, and this holds true for all kinds of display apparatus.

High image quality and high visibility is another challenge for various kinds of display apparatus.

Means for achieving high image quality and high visibility includes an image processing technique called edge enhancement.

The technique is a common approach toward improved image quality involving a process of enhancing high frequency components of an image to render the entire image with higher acutance. It is considered that improved image quality and visibility is achieved by the technique for the following reasons. One reason is that edges of an image can be rendered with an improved feel of contrast, and another reason enhancement of edges in the positive direction allows the edges to be rendered with improved brightness.

Various proposals have been made in the related art on edge enhancement, improvement of image quality, and suppression of power consumption, including the techniques disclosed in JP-A-2007-221821, JP-A-2007-249436 and JP-A-2006-236159 (Patent Documents 1, 2, and 3, respectively).

According to the technique disclosed in Patent Document 1, a histogram of edge components extracted from one display screen is created, and an amount of edge enhancement can be controlled according to the histogram to perform an edge enhancing process in a manner that is appropriate for the state of the image.

According to the technique disclosed in Patent Document 2, a gain of an amount of edge enhancement which can be effectively used without exceeding the dynamic range of an image is dynamically calculated from edge components to allow an edge enhancement process to be performed in a manner appropriate for the image.

According to the technique disclosed in Patent Document 3, optimal image processing functions of a display are only enabled while disabling unnecessary image processing functions depending on the application or the operating condition of the display.

SUMMARY OF THE INVENTION

Here, problems with self-emitting displays such as organic EL displays are addressed.

A self-emitting display consumes more power, the higher the average display brightness of its screen. Therefore, it has been considered difficult to achieve high image quality, i.e., to display images with high acutance in general, while suppressing power consumption at the same time.

For example, in the case of an LCD display, the power consumption of the display is substantially determined by the brightness of the backlight thereof, and the power consumption neither increases nor decreases even when an edge enhancing process is performed on an image according to Patent Document 1 or 2. However, some other flat panel displays, e.g., self-emitting devices such as organic EL displays and PDPs (plasma displays) have a problem in that the displays are affected by an increase or decrease in power consumption attributable to such a process. Specifically, in the case of an organic EL display, although edge enhancement allows an image to be displayed with improved quality, power consumption is increased as a result of an increase in the brightness of edge-enhanced parts of the image, which goes against the demand for suppression of power consumption.

According to Patent Document 3, although power consumption can be suppressed by disabling unnecessary functions themselves, the approach basically allows no reduction in power consumption with various functions kept enabled. That is, functions such as edge enhancement must be disabled to achieve a reduction in power consumption. In conclusion, such a technique does not allow high image quality and high visibility to be achieved in an organic EL display along with a reduction in power consumption.

As thus described, although edge enhancement can be carried out appropriately depending on the state of the image of interest according to the related art, there has been no approach which allows suppression of an increase in power consumption attributable to edge enhancement even when used in a self-emitting display. Further, it has been inevitable to disable functions for achieving high image quality in order to suppress power consumption. That is, there has been no approach which allows an edge enhancement process to be carried out while achieving a reduction in power consumption.

Under the circumstance, it is desirable to provide a method which allows visibility of an image to be maintained or improved through edge enhancement while preventing an increase in power consumption.

According to an embodiment of the invention, there is provided a display apparatus including: an edge processing section extracting an edge component of a display data signal; a display data signal processing section changing the display data signal according to a level conversion signal and adding the edge component thereto; a level conversion signal generating section changing the level conversion signal according to the display data signal and a signal output from the display data signal processing section; and a display section performing a display operation according to the signal output from the display data processing section.

The change made in the display data may be a reduction in the brightness level thereof.

The level conversion signal generating section may calculate the amount of power consumed for emission according to each of the display data signal and the signal output from the display data processing section and change the level conversion signal according to the result of calculation of the amounts of power consumed for emission.

The level conversion signal generating section may change the level conversion signal such that an estimated amount of power consumed for emission at the display section according to the signal output from the display data signal processing section becomes smaller than an estimated amount of power consumed for emission at the display section according to the display data signal.

The level conversion signal may be in accordance with a value obtained by multiplying the ratio between the calculated mounts of power consumed for emission by a coefficient.

The coefficient may be in accordance with a power suppression control signal.

The edge processing section may change the edge component according to an edge amount control signal.

The edge processing section may include: an edge extraction filter extracting an edge component from a display data signal; and an edge amount changing portion changing the edge component according to an edge amount control signal.

The edge amount changing portion may perform: a correction process on the edge component using a non-linear function; and a calculation process using an output signal obtained by the correction process and the edge amount control signal.

The display data processing section may perform the process of adding the edge component after changing the display data signal according to the level conversion signal.

The display data processing section may perform the process of adding the edge component before changing the display data signal according to the level conversion signal.

According to another embodiment of the invention, there is provided a display data processing device including: an edge processing section extracting an edge component of a display data signal; a display data signal processing section changing the display data signal according to a level conversion signal and adding the edge component thereto; and a level conversion signal generating section changing the level conversion signal according to the display data signal and a signal output from the display data signal processing section.

According to still another embodiment of the invention, there is provided a display data processing method including the steps of: extracting an edge component of a display data signal; changing the display data signal according to a level conversion signal and adding the edge component thereto; and changing the level conversion signal according to the display data signal and a signal output from the display data signal processing section.

According to the embodiments of the invention, an edge enhancement process and a process of controlling an overall brightness level are performed separately. Thus, an increase in power consumption, which is a problem specific to self-emitting displays, can be reliably prevented with the visibility improving effect of the edge enhancement process maintained.

When a reduction in visibility can be suppressed as thus described, overall brightness can be actively increased while suppressing power consumption.

Further, the level of overall brightness is controlled such that electric power for emission or display estimated or calculated from an output display data signal always becomes lower than electric power for emission or display estimated or calculated from an input display data signal. Thus, an increase in power consumption can be prevented regardless of the level of edge enhancement and the content of a video signal of interest.

As described above, the power consumption of a self-emitting display is increased by increasing the brightness of edge parts of an image, although image quality is improved by edge enhancement.

From a different point of view, it may be said that the increase in power consumption is limited to the edge parts and that visibility is improved more efficiently in terms of power consumption than increasing the brightness of the image as a whole.

That is, an overall brightness level may be suppressed with the level of edge enhancement kept unchanged, which allows a reduction in visibility resulting from a reduction in the overall brightness to be cancelled by the visibility improving effect of edge enhancement.

A certain level of visibility can be maintained by maintaining peak brightnesses of edge parts at certain levels even if overall brightness is suppressed, and power consumption can be reliably suppressed.

According to the embodiments of the invention, an increase in power consumption that is a problem specific to self-emitting displays resulting from an edge enhancement process can be reliably prevented regardless of the image of interest and the level of edge enhancement while keeping the image quality/visibility improving effect of the edge enhancement process at a certain level.

Further, the embodiments make it possible to reliably achieve a target power suppression rate and to reduce power consumption in an active manner while suppressing degradation of visibility attributable to a reduction in brightness.

BRIEF DESCRIPTION OF THE DRAWINGS

FIGS. 5A and 5B are graphs and illustrations for explaining an edge extraction filer of the embodiment;

DESCRIPTION OF PREFERRED EMBODIMENTS

Details of an embodiment of the invention will now be described in the following order of items.
1. Configuration of Display Apparatus
2. Configuration of Display Data Processing Section
3. Power-Suppressed Edge Enhancement by Display Data Processing Section
4. Another Exemplary Configuration of Display Data Processing Section
5. Modification

1. Configuration of Display Apparatus

Figure 1:
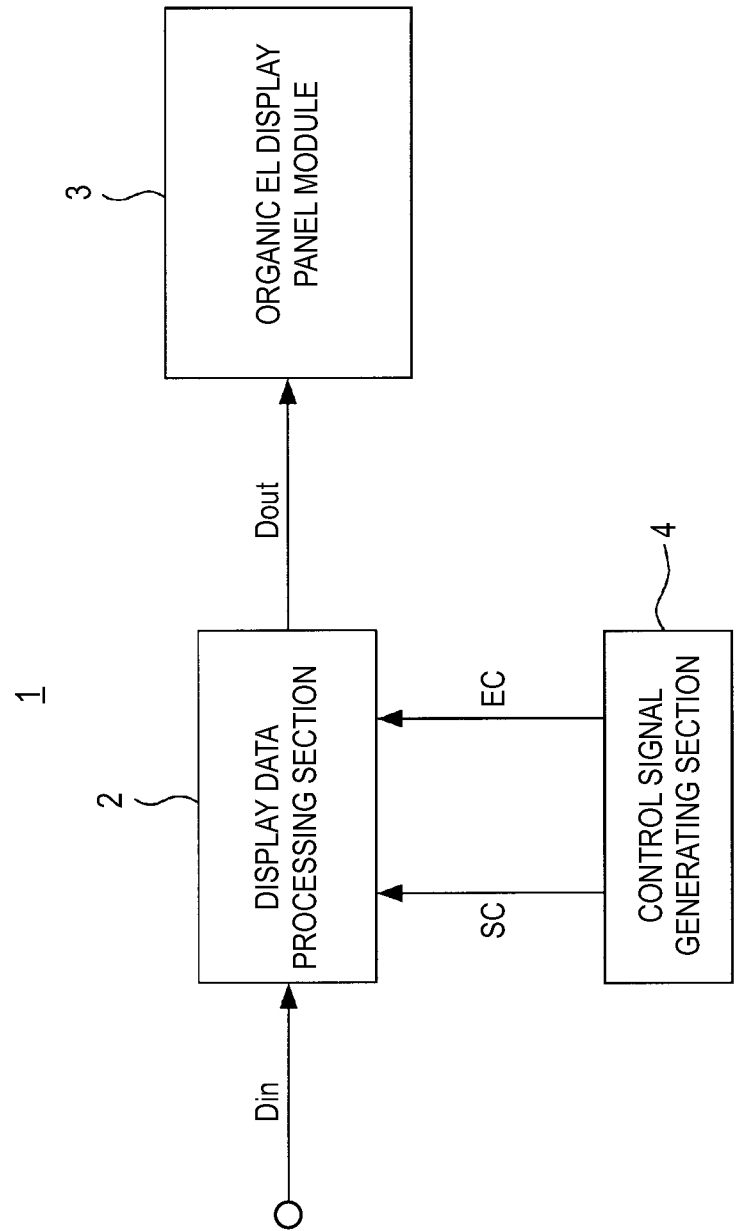
FIG. 1 is a block diagram of major parts of a display apparatus according to an embodiment of the invention.

FIG. 1 shows a configuration of major parts of a display apparatus according to an embodiment of the invention. A display apparatus 1 according to the present embodiment includes an organic EL display panel module 3 employing organic EL elements as light-emitting elements.

A display data processing section 2 is provided as a section for processing display data signals supplied to the organic EL display panel module 3. The display data processing section 2 performs processes as will be described later on a display data signal Din and supplies a processed display data signal Dout to the organic El display panel module 3.

A control signal generating section 4 is provided to generate signals (a power suppression control signal SC and an edge amount control signal EC) for controlling some of processing operations of the display data processing section 2. The control signal generating section 4 a power suppression control signal SC and an edge amount control signal EC having required values according to operations performed by a user on the display apparatus 1 or processes performed by an application program.

The organic EL display panel module 3 will now be described with reference to FIGS. 2 and 3.

Figure 2:
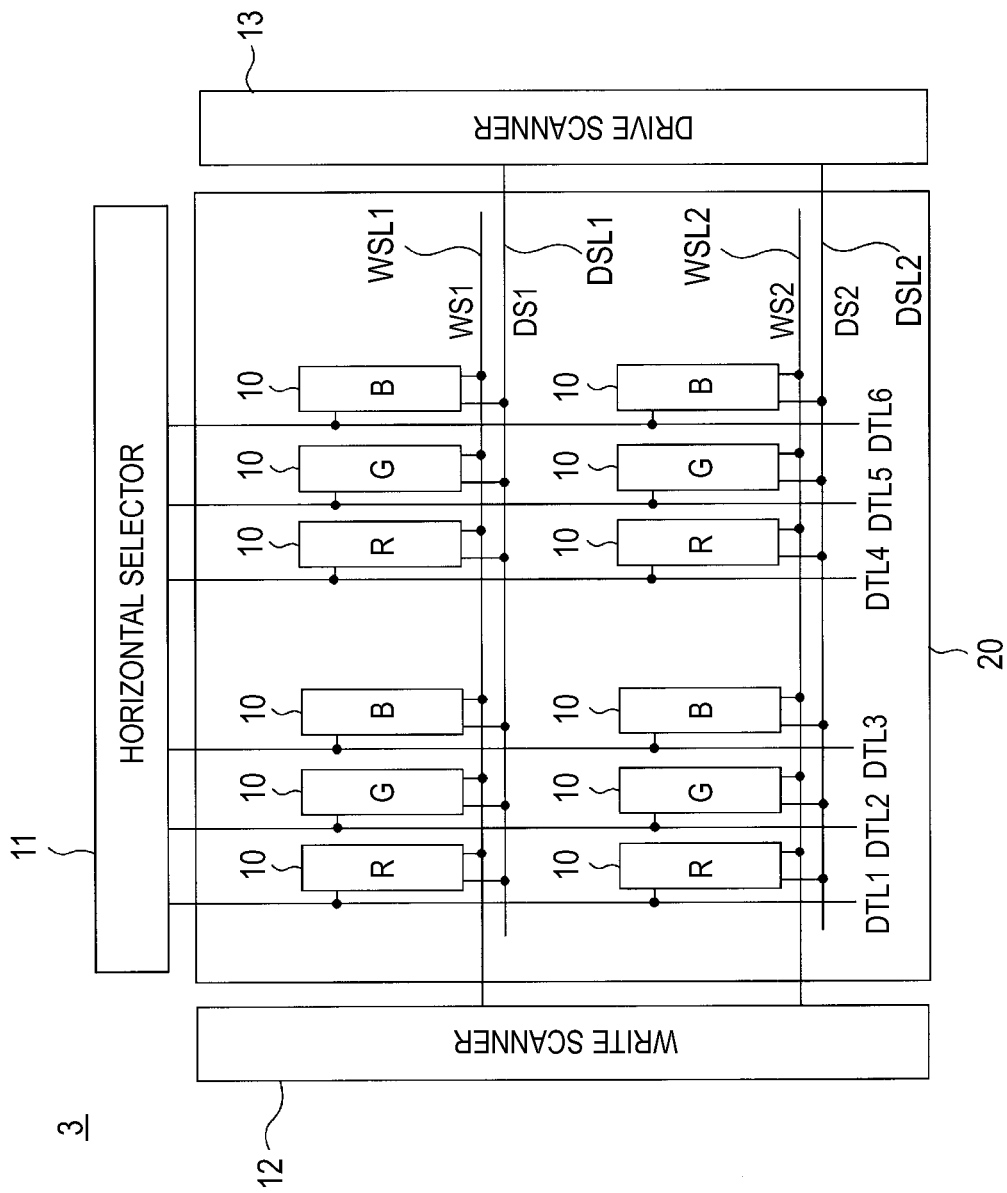
FIG. 2 is an illustration of an organic EL display panel module of the embodiment.

FIG. 2 shows an exemplary configuration of the organic EL display panel module 3. The organic EL display panel module 3 includes pixel circuits 10 which drive organic EL elements serving as light-emitting elements for emission in the active matrix mode.

As shown in FIG. 2, the organic EL display panel module 3 has a pixel array section 20 in which the pixel circuits 10 are arranged in the form of a matrix having a column direction and a row direction. The pixel circuits 10 are labeled "R", "G", and "B", and the labels indicate that the circuits serve as pixels emitting light in respective colors, i.e., R (red), G (green), and B (blue).

The module includes a horizontal selector (data driver) 11, a write scanner 12, and a drive scanner (drive control scanner) 13 for driving each of the pixel circuits 10 of the pixel array section 20.

Signal lines DTL1, DTL2, and so on which are selected by the horizontal selector 11 to supply video signals according to brightness information to the pixel circuits 10 are disposed in the column direction of the pixel array section 20. The signal lines DTL1, DTL2, and so on are provided in a quantity equivalent to the number of columns of the pixel circuits 10 disposed in the form of a matrix at the pixel array section 20.

Write control lines WSL1, WSL2, and so on and power supply control lines DSL1, DSL2, and so on are disposed in the row direction of the pixel array section 20. Each of the groups of write control lines WSL and power supply control lines DSL is provided in a quantity equivalent to the number of rows of the pixel circuits 10 disposed in the form of a matrix at the pixel array section 20.

The write control lines WSL (WSL1, WSL2, and so on) are driven by the write scanner 12. The write scanner 12 sequentially supplies scan pulses WS (WS1, WS2, and so on) to the write control lines WSL1, WSL2, and so on disposed in rows at preset timing to scan the pixel circuits 10 row-by-row on a line sequential basis.

The power supply control lines DSL (DSL1, DSL2, and so on) are driven by the drive scanner 13. In accordance with the line sequential scan performed by the write scanner 12, the drive scanner 13 supplies power supply pulses DS (DS1, DS2, and so on) which are power supply voltages switching between two values, i.e., a driving potential (Vcc) and an initial potential (Vini) to the power supply control lines DSL1, DSL2, and so on disposed in the form of rows.

The horizontal selector 11 supplies a signal potential (Vsig) and a reference potential (Vofs), which are input signals to the pixel circuits 10, to the signal lines DTL1, DTL2, and so on disposed in the column direction in accordance with the line sequential scan performed by the write scanner 12.

Figure 3:
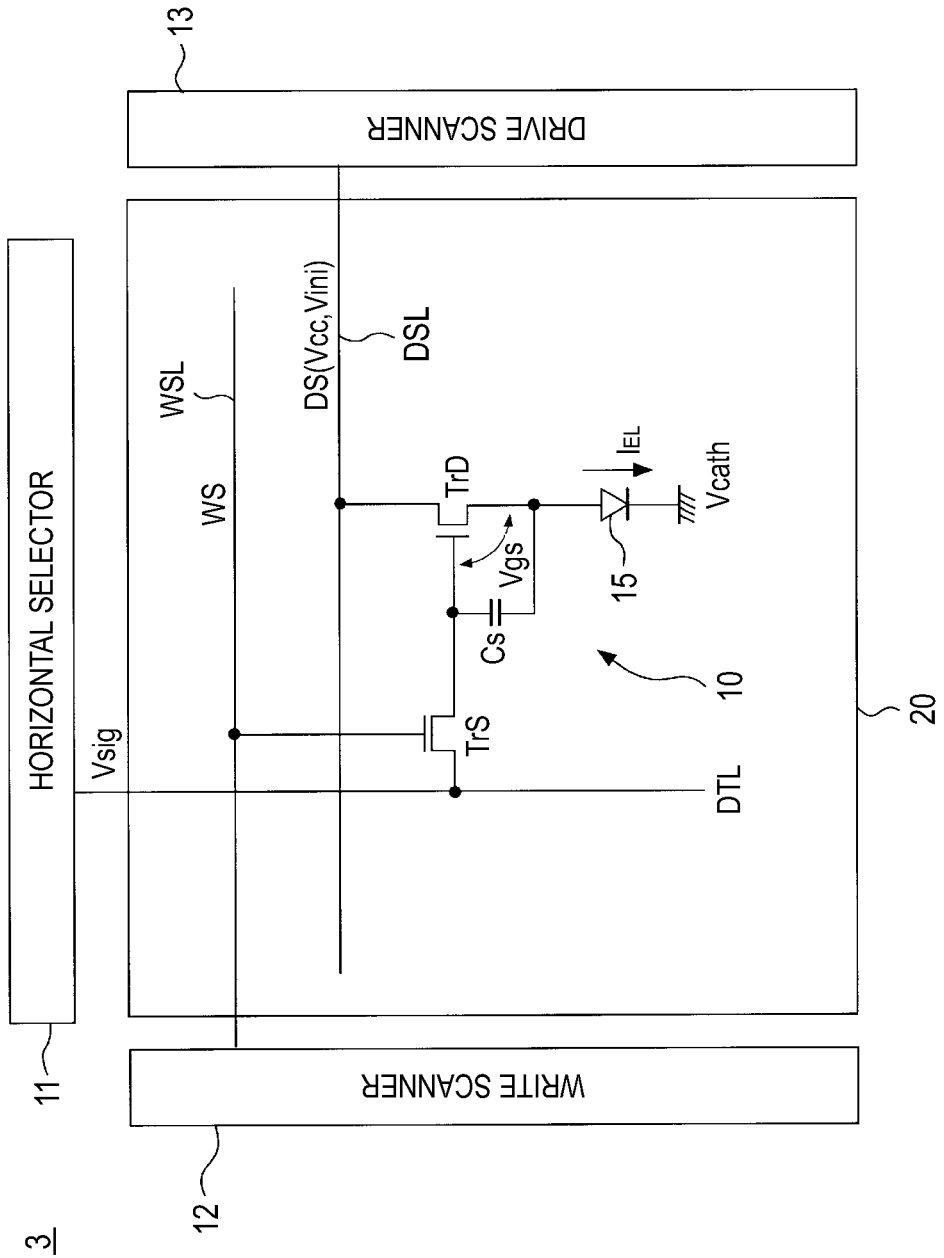
FIG. 3 is an illustration of a pixel circuit of the organic EL display panel module of the embodiment.

FIG. 3 shows a configuration of a pixel circuit 10. Such pixel circuits 10 are disposed in the form of a matrix as shown in the configuration in FIG. 2. For simplicity, FIG. 3 shows only one pixel circuit 10 disposed at a region where a signal line DTL intersects a write control line WSL and a power supply control line DSL.

The pixel circuit 10 includes an organic EL element 15 which is a light-emitting element, a sampling transistor TrS, one storage capacity Cs, and two thin film transistors (TFTs) to serve as driving transistors TrD. The sampling transistor TrS and the driving transistors TrD are N-channel TFTs.

The storage capacity Cs is connected to a source of the driving transistor TrD at one terminal thereof and connected to a gate of the driving transistor TrD at another terminal thereof.

The light-emitting element of the pixel circuit 10 is, for example, an organic EL element 15 having a diode structure, and the element has an anode and a cathode. The anode of the organic EL element 15 is connected to a source s of the driving transistor TrD, and the cathode of the element is connected to a predetermined ground wiring (a cathode potential Vcath).

A drain and a source of the sampling transistor TrS are connected to the signal line DTL at one end thereof and connected to a gate of the driving transistor TrD at another end thereof. A gate of the sampling transistor TrS is connected to the write control line WSL. A drain of the driving transistor TrD is connected to the power supply control line DSL.

The organic EL element 15 is driven for emission basically as follows.

When a signal potential Vsig is applied to the signal line DTL, the sampling transistor TrS is turned on by a scan pulse WS supplied by the write scanner 12 through the write control line WSL. Thus, the input signal Vsig from the signal line DTL is written in the storage capacity Cs. The driving transistor TrD is supplied with a current from the power supply control line DSL to which a driving potential V1 is supplied from the drive scanner 13, and the transistor applies a current IEL according to the signal potential stored in the storage capacity Cs to the organic EL element 15, thereby driving the organic EL element 15 for emission.

An operation of writing a pixel signal value (grayscale value) in the storage capacity Cs is performed in each frame period, and a gate-source voltage Vgs of the driving transistor TrD is determined by the grayscale value. The driving transistor TrD operates in its saturated domain to function as a constant current source of the organic EL element 15, and the transistor applies the current IEL according to the gate-source voltage Vgs to the organic EL element 15. Thus, the organic EL element 15 emits light having brightness corresponding to the grayscale value.

2. Configuration of Display Data Processing Section

A configuration of the display data processing section 2 will now be described.

In the present embodiment, as shown in FIG. 1, a display data signal Din is subjected to required processes at the display data processing section 2, and a processed display data signal Dout thus obtained is supplied to the organic EL display panel module 3.

At the organic display panel module 3, the display data signal Dout is supplied to the horizontal selector 11 shown in FIG. 2, and the horizontal selector 11 supplies a signal value Vsig for each pixel based on the display data signal Dout to the respective pixel circuit 10.

Referring to the processes at the display data processing section 2 particularly, the section performs an edge enhancement process on a display data signal to achieve high image quality and high visibility, and the section also reduces the overall brightness of each frame to reduce power consumption of the organic EL display panel module 3.

Figure 4:
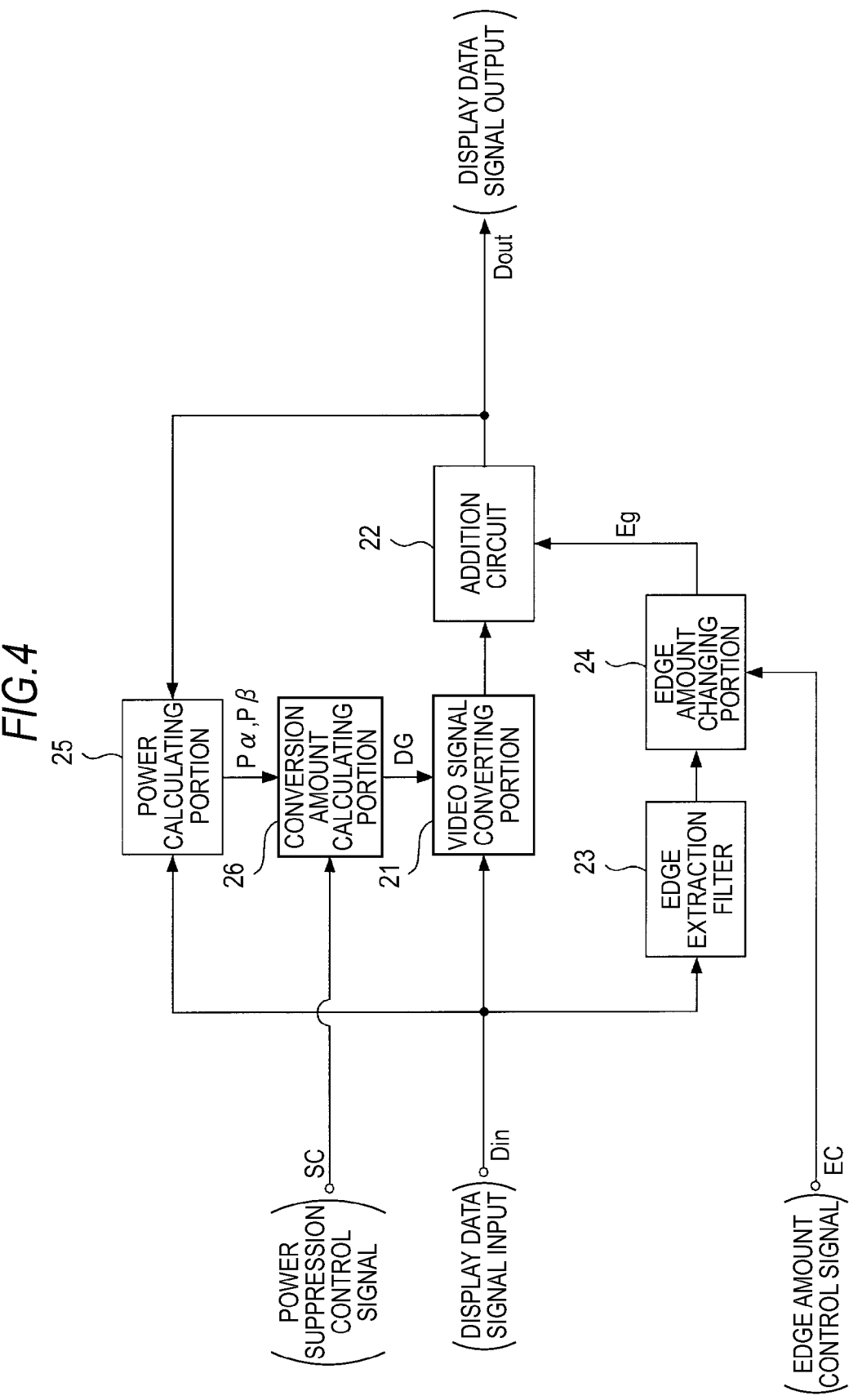
FIG. 4 is a block diagram of a display data processing section of the embodiment.

FIG. 4 shows an exemplary configuration of the display data processing section 2.

The display data processing section 2 includes a video signal converting portion 21, an addition circuit 22, and edge extraction filter 23, an edge amount changing portion 24, a power calculating portion 25, and a conversion amount calculating portion 26.

The display data signal Din is input to each of the video signal converting portion 21, the edge extraction filter 23, and the power calculating portion 25.

The video signal converting portion 21 performs a process of reducing the overall brightness level of a display data signal. For example, the level of each frame of the display data signal Din is converted in the direction of decreasing an overall brightness value of the frame based on a level conversion signal DG supplied from the conversion amount calculating portion 26.

For example, the level conversion signal DG may be a gain coefficient, and the video signal converting portion 21 may be formed as a multiplication circuit which multiplies the display data signal Din by the level conversion signal DG to convert the level of the signal.

Alternatively, the level conversion signal DG may be an offset value, and the video signal converting portion 21 may be formed as a subtraction circuit which substrates the level conversion signal DG from the display data signal Din to convert the level of the signal.

The edge extraction filter 23 extracts edge components (high frequency components) of the display data signal Din.

FIG. 5A shows an example of edge extraction performed by the edge extraction filter 23. In general, a second-order differential high-pass filter (HPF) is used as a filter for extracting edges (high frequency components) because both of preshoots and overshoots are to be enhanced. The edge extraction filter 23 extracts a second-order differential waveform from an edge of an input signal (display data signal Din) as illustrated.

For example, second-order differential filters use data in the neighborhood of a pixel of interest as shown in FIG. 5B. It is a common practice to employ a filter in consideration to spatial directions of interest. A horizontal second-order differential filter is employed when only neighboring data in the horizontal direction are to be used. A vertical second-order differential filter is employed when only neighboring data in the vertical direction are to be used. A four-neighbors Laplacian digital filter is employed when neighboring data in the vertical and horizontal directions are to be used. An eight-neighbors Laplacian digital filter is employed when neighboring data in the vertical, horizontal, and diagonal directions are to be used.

The edge amount changing portion 24 changes the level of an edge amount output from the edge extraction filter 23 based on an edge amount control signal EC supplied from the control signal generating section 4 shown in FIG. 1.

Figures 6A, 6B:
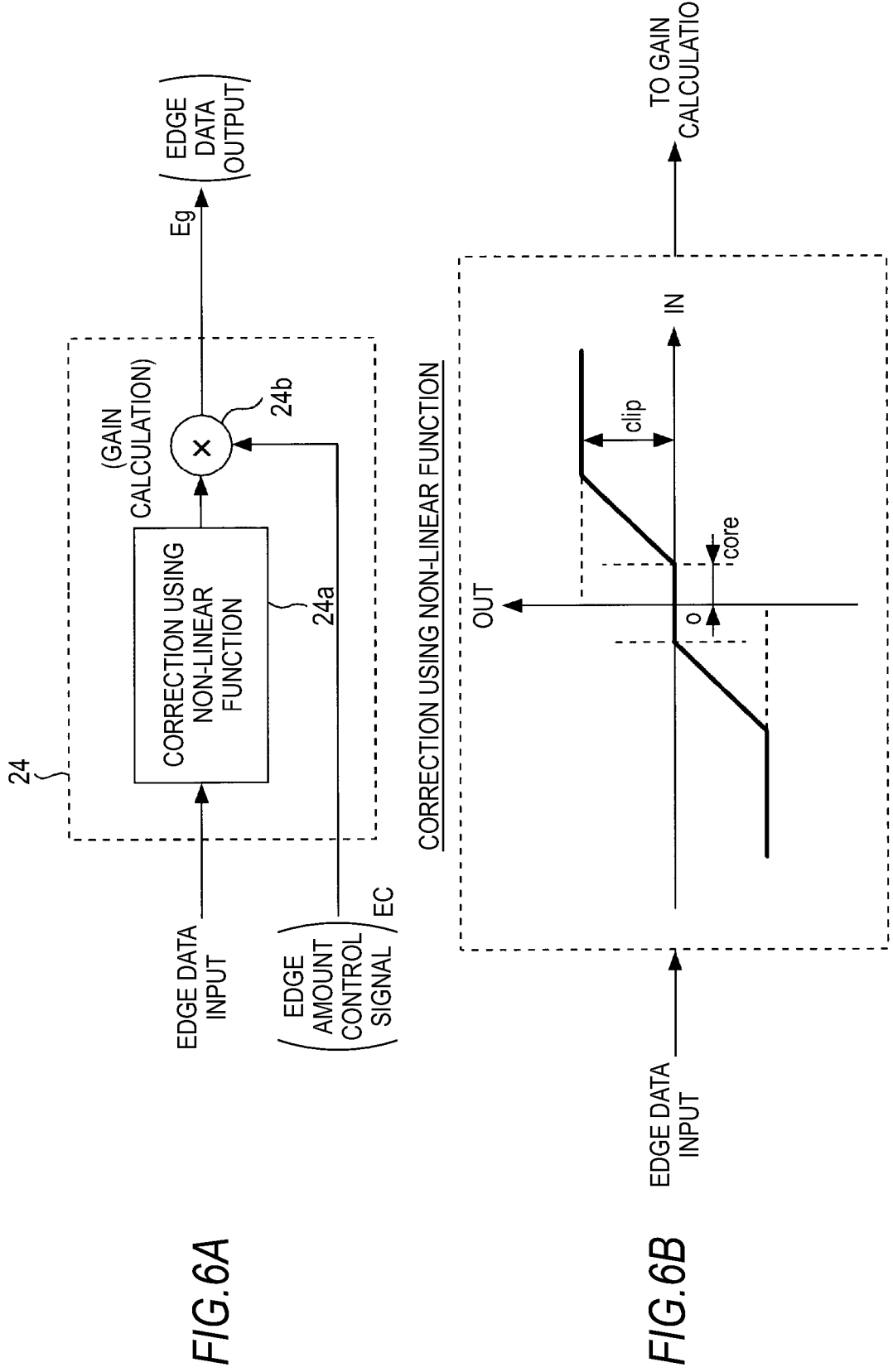
FIGS. 6A and 6B are diagrams for explaining an edge amount changing portion of the embodiment.

FIG. 6A shows an example of the edge amount changing portion 24.

The edge amount changing portion 24 includes a non-linear function correction circuit 24a and a gain calculation circuit 24b.

The non-linear correction circuit 24a serves two major purposes, i.e., suppression of noise enhancement and suppression of a preshoot and an overshoot (edge enhancement with great amplitude). The former is referred to as "coring", and the latter is referred to as "clipping".

FIG. 6B shows how coring and clipping is performed.

As illustrated, an edge output according to an extracted edge amount is limited using two parameters, i.e., "core" and "clip".

The parameter "core" for coring is determined according to the amount of noise.

The parameter "clip" is determined to suppress edge enhancement with great amplitude.

Although the two parameters may be varied, they are given as fixed values in general to serve the function of suppressing degradation of image quality attributable to edge enhancement, and the values are determined appropriately while checking an image.

The gain calculation circuit 24b performs multiplication between an edge component which has been corrected by the non-linear function correction circuit 24a and the edge amount control signal EC input thereto. The output of the gain calculation circuit 24b is supplied to the addition circuit 22 shown in FIG. 4 as edge data Eg.

The addition circuit 22 performs a process of adding the edge data Eg to a display data signal output from the video signal converting portion 21.

Specifically, the circuit adds the edge data Eg to the display data signal to obtain an edge-enhanced display data signal Dout. The display data signal Dout is supplied to the organic EL display panel module 3. That is, the display data signal Dout supplied to the organic EL display panel module 3 is an edge-enhance signal having an overall level which has been reduced by the video signal converting portion 21.

As described with reference to FIGS. 6A and 6B, the edge data Eg is a value obtained by multiplying a second-order differential component obtained at the edge extraction filter 23 by the edge amount control signal EC. That is, the level of edge enhancement applied to a display data signal can be controlled by the edge amount control signal.

The display data signal Din and the display data signal Dout are supplied to the power calculating portion 25. The power calculating portion 25 estimates or calculates power consumed for emission for each frame caused by each of the display data signals Din and Dout input thereto. The calculated power amounts Pα and Pβ consumed for emission are output to the conversion amount calculating portion 26.

The conversion amount calculating portion 26 obtains the level conversion signal DG by performing a calculation using the estimated power Pα consumed for emission caused by the display data signal Din supplied from the power calculating portion 25, the estimated power Pβ consumed for emission caused by the display data signal Dout, and the power suppression control signal SC supplied from the control signal generating section 4. The power suppression control signal SC is a control value determining the degree at which the overall brightness of a display data signal is reduced.

For example, the conversion amount calculating portion 26 calculates a power consumption increase/decrease rate by comparing the estimated power amounts Pα and Pβ. The power consumption increase/decrease rate is multiplied by the power suppression control signal SC that is a coefficient corresponding to a target power suppression rate input from outside to calculate an overall brightness reduction rate at which the target power suppression rate can be achieved. The overall brightness reduction rate is output to the video signal converting portion 21 as the level conversion signal DG.

The calculation processes performed by the power calculating portion 25 and the conversion amount calculating portion 26 to obtain the level conversion signal DG will be described later using specific examples. The level conversion signal DG is a gain value or an offset value applied to achieve a level reduction at the video signal converting portion 21.

The level of the overall brightness of an image is controlled by a level reduction performed at the video signal converting portion 21 using the level conversion signal DG such that emitting or displaying power estimated or calculated from an output display data signal always become lower than emitting or displaying power estimated or calculated from an input display data signal regardless of the level of edge enhancement and the content of the video signal.

In the configuration shown in FIG. 4, the video signal converting portion 21 and the addition circuit 22 correspond to the "display data signal processing section" described in the summary of the invention.

The edge extraction filter 23 and the edge amount changing portion 24 correspond to the "edge processing section" described in the summary of the invention.

The power calculating portion 25 and the conversion amount calculating portion 26 correspond to the "level conversion signal generating section" described in the summary of the invention.

3. Power-Suppressed Edge Enhancement by Display Data Processing Section

At the display data processing section 2 as described above, an edge enhancement process and an overall brightness level control process are performed separately. Thus, an increase in power consumption that is a problem specific to self-emitting displays can be reliably prevented while maintaining the visibility improving effect of the edge enhancement process.

The overall brightness of an image can be actively reduced to suppress power consumption further, provided that degradation of visibility can be suppressed.

A power-suppressed edge enhancement process performed by the display data processing section will now be described.

As described above, the power calculating portion 25 estimates or calculates the amount of power consumed to display one screen (power consumed for emission) according to each of the display data signals Din and Dout. The power consumed for emission according to the display data signal Din is power consumed for one frame estimated on an assumption that the display data signal Din is supplied to the organic EL display panel module 3 to drive it for emission. The power consumed for emission according to the display data signal Dout is power consumed for one frame estimated on an assumption that the display data signal Dout is supplied to the organic EL display panel module 3 to drive it for emission.

A method of estimating or calculating the amounts of power consumed for emission will now be described.

As described above with reference to FIG. 3, each pixel circuit 10 of the organic EL display panel module 3 is driven for emission bypassing a current through the organic EL element 15.

An emission current and brightness are in a relationship represented by I-L characteristics, and they are in a proportionate relationship with each other in general. Therefore, a current to be passed to achieve a required level of brightness is uniquely determined.

The organic EL element 15 is driven for emission by passing a current IEL required for emission as thus described from a voltage source Vcc (a driving potential Vcc supplied to the power supply control line DSL shown in FIG. 3) to the cathode of the element (the node represented by Vcath). Therefore, consumed power PEL associated with the emission of the organic EL element 15 is represented as follows.

$$PEL=(Vcc-Vcath) \times IEL$$

Since the driving potential Vcc and the cathode potential Vcath have fixed values in general, the consumed power can be estimated or calculated when the current IEL can be derived according to the video data (grey level value) of interest.

Figure 7:
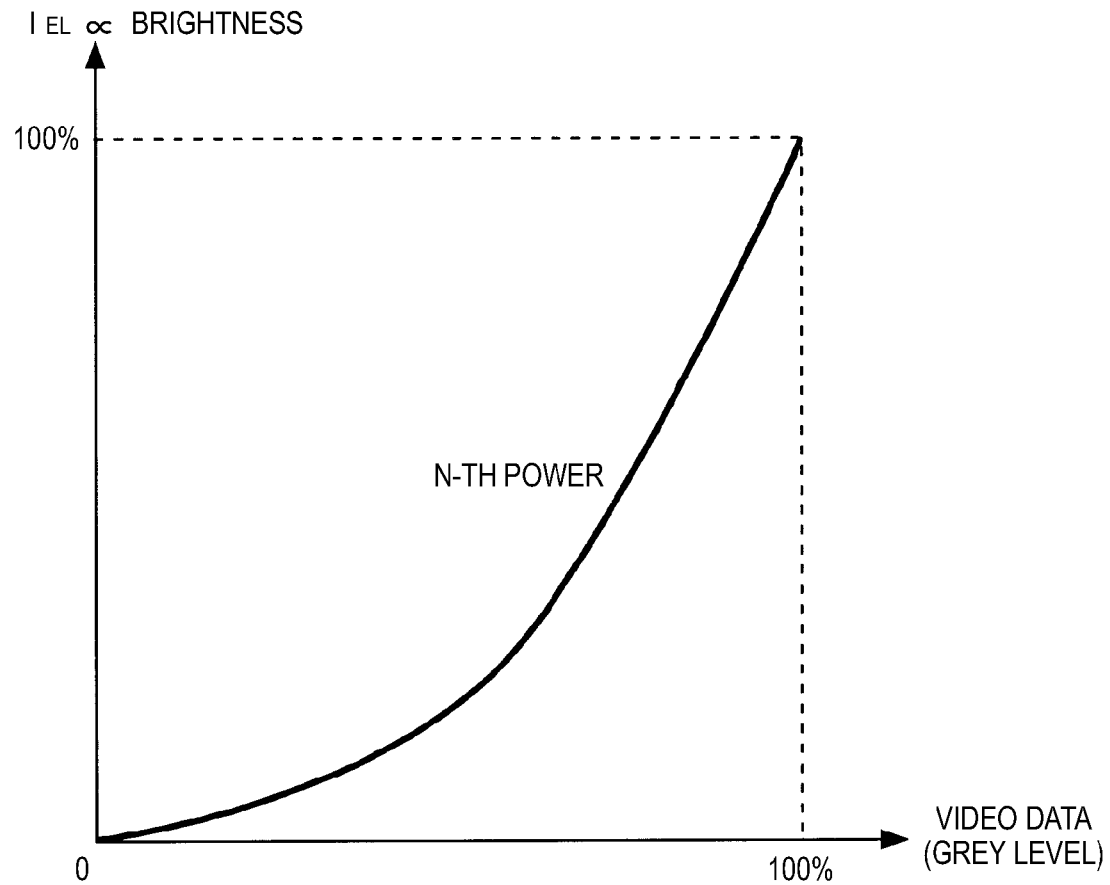
FIG. 7 is a graph for explaining a power calculation method according to the embodiment.

In a display device, in general, an emission current is adjusted such that it becomes a function of a certain power of video data as shown in FIG. 7. In the case of a television monitor, the 2.2-th power is commonly used.

That is, a calculation for converting video data into data corresponding to a current can be carried out if such information on gamma characteristics (n-th power) is available in advance. The conversion may be carried out according to either a method using calculations or a method using a table.

In general, a pixel of a display is formed by sub-pixels of three colors, i.e., R, G, and B. It is therefore required to obtain information on a current ratio required for emitting light at a reference white level, in advance.

Results of a calculation "(grey level/100% gray level)$^n$" obtained at respective sub-pixels are summed up according to a reference white current ratio to calculate an average value, whereby an amount corresponding to power required for one pixel can be calculated. The same step is carried out for all pixels to calculate an average value.

Such values can be compared with each other to calculate a power amount increase/decrease rate.

Specific examples of the calculation of power consumed for emission performed at the power calculating portion 25 an the calculation of the level conversion signal DG performed at the conversion amount calculating portion 26 will now be described with reference to FIG. 8.

Figure 8:
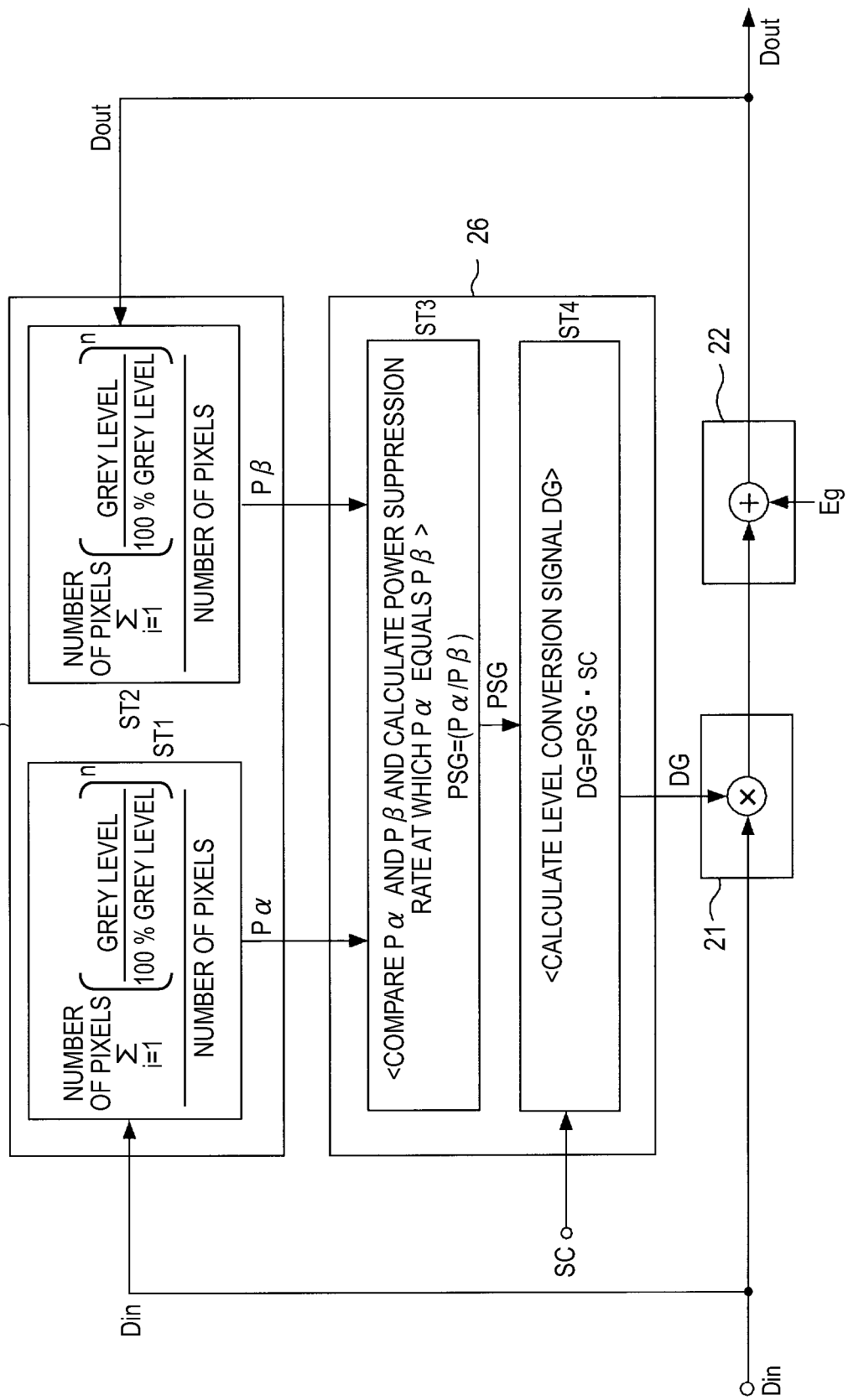
FIG. 8 is a diagram for explaining an example of a level conversion signal calculating process according to the embodiment.

FIG. 8 shows details of calculation processes performed at the power calculating portion 25 and the conversion amount calculating portion 26 among the features shown in FIG. 4. The edge extraction filter 23 and the edge amount changing portion 24 are omitted in FIG. 8.

At step ST1, the power calculating portion 25 estimates or calculates the power Pα consumed for emission according to the display data signal Din.

At step ST2, the power Pβ consumed for emission according to the display data signal Dout is estimated or calculated.

The amounts of power Pα and Pβ consumed for emission are estimated or calculated as parameters of power required for one display screen from the display data signal Din and the display data signal Dout, respectively.

Specifically, they are calculated as average values obtained by dividing respective values of (grey level/100% gray level)$^n$ integrated over the entire pixels ($\Sigma\{$(gray level/100% grey level)$^n\}$) by the number of pixels. That is, the amounts are calculated as follows.

$$P\alpha = (\Sigma\{\text{(gray level/100\% grey level)}^n\})/\text{number of pixels}$$

$$P\beta = (\Sigma\{\text{(gray level/100\% grey level)}^n\})/\text{number of pixels}$$

A grey level is a display data signal value associated with each pixel, and a 100% grey level is a display data signal value of the pixel at maximum brightness. The character "n" represents a value corresponding to the n-th power shown in FIG. 7.

Thus, power consumed for each pixel in one frame is estimated by calculating (gray level/100% grey level)$^n$ for the signal value (grey level) of the pixel, and such values are integrated over the entire pixels. The integrated value is divided by the number of pixels to obtain an average value, whereby power consumed for emission per pixel is identified.

The conversion may be carried out using calculations according to the expressions shown above. Alternatively, part of the converting calculations involving exponential calculations may be carried out using a table prepared in advance.

For example, a calculation is carried out as shown below in the case of RGB sub-pixels where it is assumed that an RGB current ratio to be satisfied for emitting in the reference white is 1:2:3.

$$P\alpha = (\Sigma([1\times\{(R \text{ grey level}/100\% \text{ grey level})^n\} + 2\times\{(G \text{ grey level}/100\% \text{ grey level})^n\} + 3\times\{(B \text{ grey level}/100\% \text{ grey level})^n\}]/(1+2+3))/\text{number of pixels}$$

When the power amounts P$\alpha$ and P$\beta$ consumed for emission are calculated as thus described, the level conversion signal DG is calculated at the conversion amount calculating portion 26 using the power amounts P$\alpha$ and P$\beta$.

At step ST3, the power amounts P$\alpha$ and P$\beta$ consumed for emission are compared with each other to calculate a power suppression rate PSG at which P$\alpha$ equals P$\beta$. That is, PSG=(P$\alpha$/P$\beta$).

Let us assume that the display data signal Dout is output after being edge-enhanced at the addition circuit 22 without reducing the overall brightness level of the display data signal Din at the video signal converting portion 21. Then, the power consumed for emission according to the display data signal Dout is higher than the power consumed for emission according to the display data signal Din.

The power suppression rate PSG calculated as (P$\alpha$/P$\beta$) is such a value that the same amount of power will be consumed according to the display data signal Dout and the display data signal Din when the overall brightness level of the display data signal Din is reduced by the video signal converting portion 21 at the power suppression rate PSG.

Next, at step ST4, the conversion amount calculating portion 26 multiplies the power suppression rate PSG by the power suppression control signal SC to calculate the level conversion signal DG. That is, DG=PSG·SC.

The power suppression control signal SC is supplied from the control signal generating section 4. For example, it is a multiplication coefficient whose maximum value is 1.

The conversion amount calculating portion 26 supplies the level conversion signal DG thus calculated to the video signal converting portion 21. For example, the video signal converting portion 21 is constituted by a multiplication circuit 21*a*, and the section multiplies the display data signal Din by the level conversion signal DG serving as a gain coefficient to convert the level of the display data signal Din (reduce the overall brightness level of the signal).

Edge components are added to the level-converted display data signal at the addition circuit 22 to output a display data signal Dout.

The power suppression control signal SC used at step ST4 is a coefficient applied to the power suppression rate PSG at which estimated mounts of power consumed for emission according to the display data signals Din and Dout become equal to each other. Therefore, the signal is a value which determines the degree of a reduction in power consumption.

For example, when the value of the power suppression control signal SC is 1, the level conversion signal DG equals the power suppression ratio PSG. In this case, the display data signal Dout can be obtained such that it results in power consumption in the same amount as power consumption caused by the display data signal Din, while achieving an improvement in visibility through edge enhancement.

When the power suppression control signal SC has a value lower than 1 such as 0.9 or 0.8, the display data signal Dout can be obtained such that it results in power consumption in an amount smaller than power consumption caused by the display data signal Din, while achieving an improvement in visibility through edge enhancement.

The value of the power suppression control signal SC may be 1 or a predetermined value smaller than 1, and such a value may be selected by a user or set by an application or firmware.

A relationship between the edge enhancement process and electric power and the effect of preventing an increase in power consumption achieved by the present embodiment will now be described with reference to FIG. 9.

Figure 9:
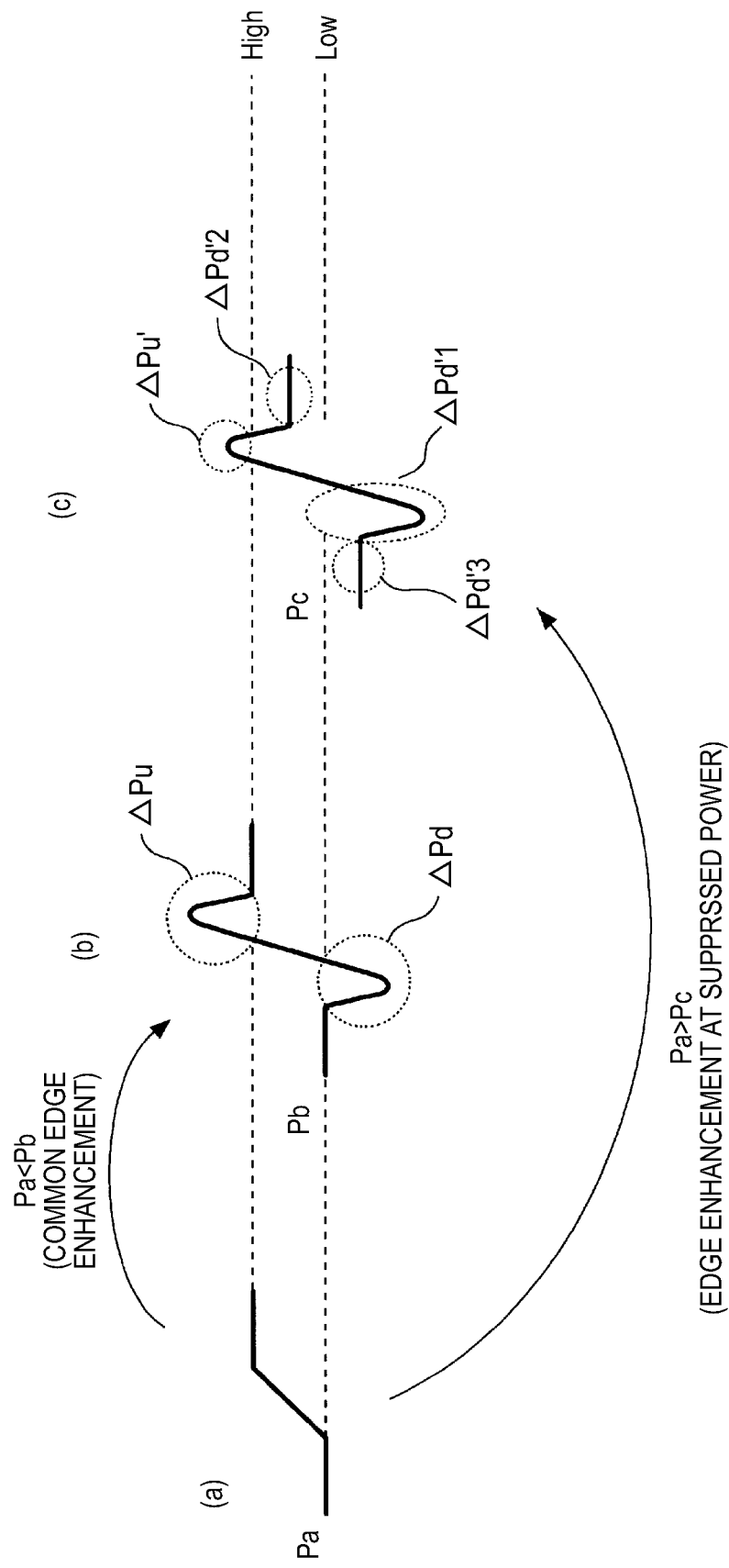
FIG. 9 shows graphs for explaining effects of power-suppressed edge enhancement according to the embodiment.

For example, let us assume that an edge changing from a low level to a high level as shown in part (a) in FIG. 9 exists on a display screen.

When a common edge enhancement process is performed on such an edge, a preshoot and an overshoot are added to the low and high levels, respectively (the amounts of the preshoot and the overshoot are equal to each other), as shown in part (b) in FIG. 9 as a result of the process.

In such a case, since the process has a gamma characteristic close to 2.2 (or greater than 1) as described above, incremental power consumption at the positive edge is always greater than decremental power consumption at the negative edge.

When the amount of the decrease in power at the negative edge and the amount of the increase in power consumption at the positive edge are represented by $\Delta$Pd and $\Delta$Pu, respectively, as illustrated, it is obvious that $\Delta$Pu is greater than $\Delta$Pd. That is, when an edge enhancement process is performed in an ordinary manner, the process results in an increase in power consumption.

Therefore, when the amounts of power consumption before and after the edge enhancement are represented by Pa and Pb, respectively, Pb is greater than Pa.

On the contrary, according to the present embodiment, edge enhancement is performed while suppressing an increase in power consumption.

Specifically, a reduction in overall brightness is controlled with the amount of edge enhancement kept unchanged as illustrated in part (c) in FIG. 9. Thus, an increase in power consumption is reliably prevented while suppressing degradation of visibility.

As a result of the reduction in overall brightness, an increase in power consumption at the negative edge has an amount $\Delta$Pu' as shown in part (c) in FIG. 9. There is a decrease in power consumption represented by $\Delta$Pd' which includes a decrease $\Delta$Pd'1 in power consumption at the negative edge and decreases ΔPd'2 and ΔPd'3 in power consumption at regions other than the edges (ΔPd'=ΔPd'1+ΔPd'2+ΔPd'3).

In other words, the increase ΔPu' is suppressed to be ΔPu'<ΔPu as a result of the edge enhancement while reducing overall brightness. Further, the decrease ΔPu' can be adjusted to be ΔPu'ΔPd'.

That is, when power consumption after the power-suppressed edge enhancement process is represented by Pc, Pa≥pc holds true.

In the present embodiment as thus described, the peak brightness of an edge part can be maintained at a degree compatible with the effect of improving the contrast at the edge part. Thus, a reduction in power consumption can be achieved with degradation of visibility suppressed at the same time.

Further, reduction of power consumption may be actively pursued unless significant reduction in visibility occurs.

For example, the consumed power Pa shown in FIG. 9 corresponds to the power Pα consumed for emission according to the display data signal Din, and the consumed power Pc corresponds to the power Pβ consumed for emission according to the display data signal Dout. Therefore, when the power suppression control signal SC is 1 in the process shown in FIG. 8, edge enhancement can be performed to achieve improved visibility with power consumed for emission prevented from increasing from the amount before the edge enhancement.

The occurrence of increases in power consumption attributable to edge enhancement is limited to regions having edges. Therefore, the embodiment is considered more efficient in improving visibility of an image than increasing the overall brightness of the same in terms of power consumption. That is, an overall brightness level can be suppressed with the level of edge enhancement kept unchanged, which allows a reduction in visibility resulting from a reduction in overall brightness to be cancelled by the visibility improving effect of edge enhancement. The reduction in overall brightness allows an increase in power consumption to be suppressed.

Referring to FIG. 8 again, the video signal converting portion 21 performs a multiplication process, and the conversion amount calculating portion 26 calculates a coefficient for the multiplication (a gain applied to the display data signal Din) as a level conversion signal DG. When an overall brightness level is reduced by multiplying it by a gain as thus described, the overall brightness can be reduced without making low grey levels indistinguishable, and the gradation of the displayed image will not be degraded.

The video signal converting portion 21 may be configured to impart a negative offset to the display data signal Din.

For example, the conversion amount calculating portion 26 may calculate an offset value which makes the emitting power consumption amount Pα equal to or smaller than the emitting power consumption amount Pβ, as the level conversion signal DG. The offset value may be subtracted from the display data signal Din at the video signal converting portion 21.

In this case, although gradation is somewhat degraded in the region of low grey levels, the effect of improving visibility through edge enhancement and preventing an increase in power consumption or reducing power consumption can be similarly achieved.

4. Another Exemplary Configuration of Display Data Processing Section

Figure 10:
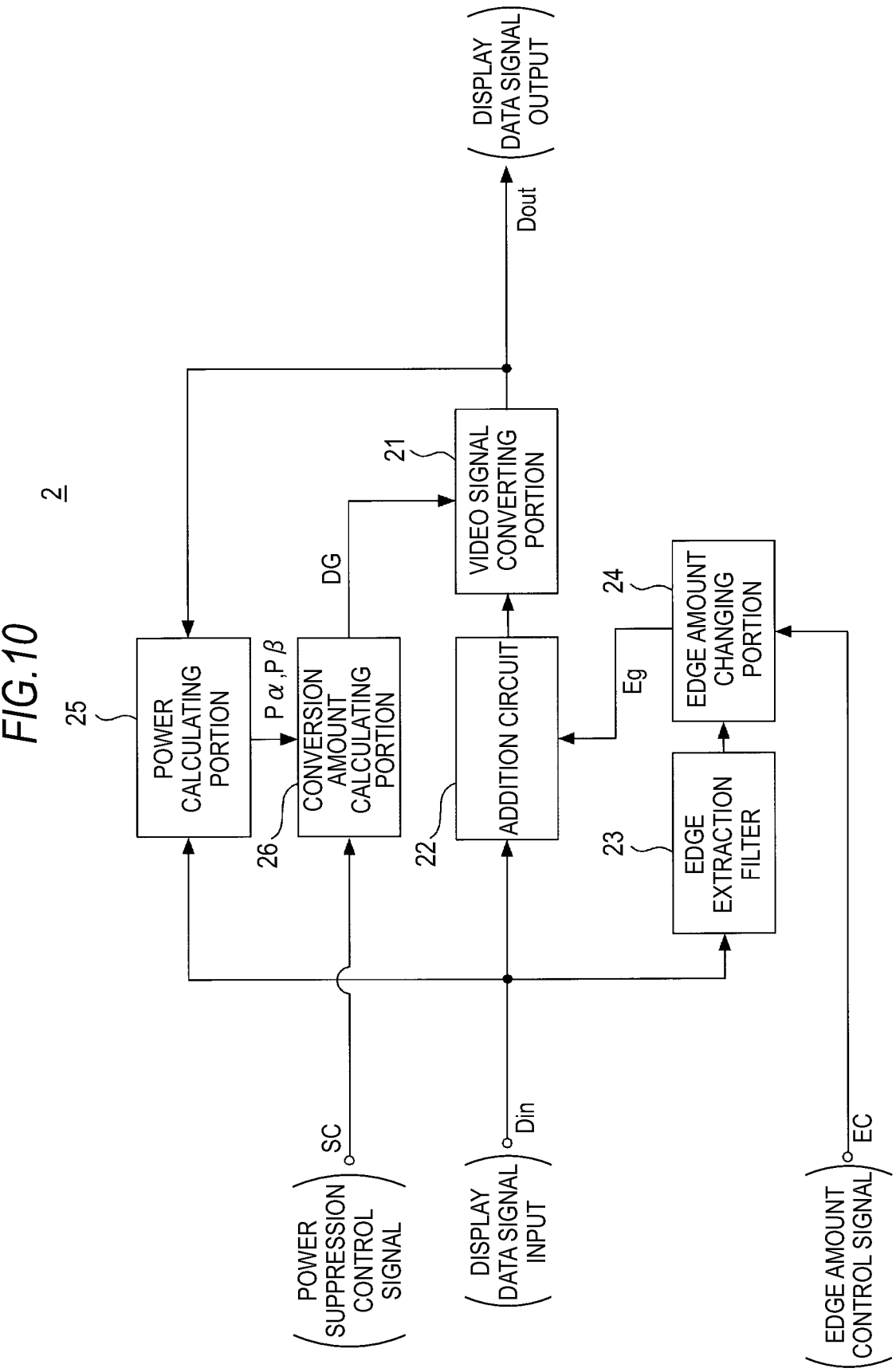
FIG. 10 is a block diagram of another exemplary configuration of the display data processing section of the embodiment.

FIG. 10 shows another exemplary configuration of the display data processing section 2. Features identical between FIGS. 4 and 10 are indicated by like reference numerals. FIG. 10 shows an exemplary configuration in which the positions of the addition circuit 22 and the video signal converting portion 21 are reversed from those shown in FIG. 4.

Specifically, the display data signal Din is input to the addition circuit 22 first, and the edge data Eg from the edge amount changing portion 24 is added to the signal at the addition circuit 22.

After an edge-enhanced display data signal is generated at the addition circuit 22 as thus described, the display data signal is supplied to the video signal converting portion 21.

The video signal converting portion 21 is supplied with the level conversion signal DG from the conversion amount calculating portion 26, and the portion multiplies the display data signal by the level conversion signal DG which may be, for example, a gain coefficient, thereby reducing the overall brightness level of the image. The output of the video signal converting portion 21 is supplied to the organic EL display panel module 3 as the display data signal Dout.

The generation of the level conversion signal DG by the power calculating portion 25 and the conversion amount calculating portion 26 and the generation of the edge data Eg by the edge extraction filter 23 and the edge amount changing portion 24 is performed in a manner similar to that shown in FIG. 4.

In this exemplary configuration, a display data signal is first edge-enhanced, the overall brightness level of the signal is thereafter reduced.

Therefore, when the video signal converting portion 21 is configured to multiply a display data signal by the level conversion signal DG, edge components will be also suppressed. However, the configuration is still advantageous in achieving improved visibility and preventing an increase in power consumption (or reducing power consumption).

In this respect, it is conceivable that the edge component level is increased by the edge amount control signal EC in advance in anticipation of suppression of the edge component to be added.

No suppression of edge components of an image occurs when the overall brightness level is reduced by calculating an offset value as the level conversion signal DG at the conversion amount calculating portion 26 and subtracting the offset value as the level conversion signal DG from the display data signal at the video signal converting portion 21.

5. Modification

The invention is not limited to the embodiment described above, and various modifications may be made to the same.

The power suppression control signal SC is supplied to the display data processing section 2 from outside (control signal generating section 4) for calculation of the level conversion signal DG. Instead of employing such a configuration, the power suppression control signal SC may be provided as a fixed value or excluded from the calculation of the signal DG.

For example, the level conversion signal may be simply calculated using an equation "DG=Pα/Pβ" for the purpose of making the amounts of power consumed for emission according to the display data signals Din and Dout equal to each other (namely, the power consumption is prevented from increasing even when the edge addition is performed). For example, when it is intended to always achieve a 10% reduction in the amount of power consumed for emission according to the display data signal Dout, the power suppression signal SC may be fixed at a value of 0.9, and the level conversion signal may be calculated using an equation "DG=0.9·(Pα/Pβ)".

In the above description, an overall brightness level is reduced using the level conversion signal DG calculated based on estimated power amounts Pα and Pβ consumed for emission. An overall brightness level may alternatively be reduced using a gain which is always fixed (or a fixed offset value) instead of making such estimations.

The examples shown in FIGS. 4 and 10 have configurations for controlling the level of an edge component using the edge amount control signal EC. A gain applied to an edge component may alternatively be a fixed value.

In changing the level of an edge component using the edge amount control signal EC, the value of the power suppression control signal SC may be changed according to the value of the edge amount control signal EC to reduce the overall brightness level appropriately according to increase or decrease in contrast desired by the user.

An arrangement may be made to allow the power-suppressed edge enhancement process (part (c) in FIG. 9) according to the embodiment and the common edge enhancement process (part (b) in FIG. 9) to be switched depending on the application or the preference of the user, for example.

For example, when the power-suppressed edge enhancement process is performed, the level conversion signal DG calculated based on the power amounts Pα and Pβ consumed for emission is supplied to the video signal converting portion 21 as described above. When the common edge enhancement process is performed, the level conversion signal DG, which is set at a gain value of 1 (or an offset value of 0), is supplied to the video signal converting portion 21 such that the overall brightness level will not be reduced.

The present application contains subject matter related to that disclosed in Japanese Priority Patent Application JP 2008-260607 filed in the Japan Patent Office on Oct. 7, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus comprising:
    an image processing section that receives an input display data signal, executes an image conversion process based on the input display data signal to produce a converted display data signal, and
    a display section that performs a display operation according to the converted display data signal;
    wherein the image conversion process includes enhancing an edge component of the input display data signal and a brightness level conversion of the input display data signal;
    wherein an amount of the brightness level conversion is determined, by the image processing section, based on at least a change in brightness resulting from said enhancing of the edge component, and
    wherein the brightness level conversion is applied to at least an area distinct from the edge component.

2. The display apparatus according to claim 1, wherein the display section includes a plurality of self-luminescent pixels for performing the display operation.

3. The display apparatus according to claim 1, wherein the change in brightness is a reduction in brightness level.

4. The display apparatus according to claim 1, wherein the image processing section identifies a power consumption amount corresponding to emission and performs an adjustment of the amount of brightness level conversion based upon the power consumption amount.

5. The display apparatus according to claim 4, wherein the power consumption amount is an estimated power consumption amount and the adjustment correlates to a power consumption that does not exceed the estimated power consumption amount.

6. The display apparatus according to claim 5, wherein the estimated power consumption is calculated using a power consumption control coefficient.

7. The display apparatus according to claim 1, wherein the brightness level of the area distinct from the edge component is uniformly changed by the brightness level conversion.

8. The display apparatus according to claim 1, wherein the overall brightness level is changed by the brightness level conversion.

9. The display apparatus according to claim 1, wherein the change in brightness is a reduction in brightness level by an amount set by the image processing section so as to cancel an increase of a power consumption caused by enhancing the edge component.

10. An electronic device comprising the display apparatus according to claim 1.

11. The electronic device according to claim 10, wherein the image processing section is configured such that at least one of the brightness level conversion or the enhancement of the edge component is executed based on a condition selectable by a user.

12. A display apparatus comprising:
    an image processing section that receives an input display data signal, executes an image conversion process based on the input display data signal, and outputs the converted display data signal, and
    a display section that performs a display operation according to the converted display data signal from the image processing section;
    wherein the image conversion process includes:
        extraction of an edge component based on a display data signal,
        enhancement of an edge component based on the extracted edge component, and
        brightness level conversion of an input display data signal according to a level conversion amount;
    wherein the level conversion amount is determined, by the image processing section, based on a change in brightness resulting from the enhancement of the edge component, according to the display data signal, and
    wherein the brightness level conversion is applied to at least an area distinct from the edge component.

13. The display apparatus according to claim 12, wherein the display section includes a plurality of self-luminescent pixels for performing the display operation.

14. A display apparatus comprising:
    an image processing section that receives an input display data signal, executes an image conversion process based on the input display data signal to produce a converted display data signal, and
    a display section that performs a display operation according to the converted display data signal,
    wherein the image conversion process includes enhancing an edge component of the input display data signal and a brightness level conversion of the input display data signal,
    wherein an amount of the brightness level conversion is a predetermined amount being independent of a change in brightness resulting from said enhancing of the edge component, and wherein the brightness level conversion is applied to at least an area distinct from the edge component.

15. A display apparatus comprising:
an image processing section configured to perform image conversion processes on a display data signal input thereto and thereby produce a converted display data signal; and
a display section configured to perform a display operation based on the converted display data signal,
wherein the image conversion processes include:
   detecting edge components of an image frame of the display data signal,
   performing edge enhancement for each of the detected edge components, and
   converting brightness levels for at least portions of the image frame that are distinct from any of the detected edge components, an amount of the brightness level conversion being based at least in part on a change in brightness resulting from performing edge enhancement.

16. The display apparatus according to claim 15, wherein said converting brightness levels is performed for all of the image frame.

17. The display apparatus according to claim 16, wherein said converting brightness levels is performed on the display data signal, thereby producing a brightness-converted signal, and said edge enhancement is performed on the brightness-converted signal, thereby producing the converted display data signal.

18. The display apparatus according to claim 16, wherein said edge enhancement is performed on the display data signal, thereby producing an edge-enhanced signal, and said converting brightness levels is performed on the edge-enhanced signal, thereby producing the converted display data signal.

* * * * *